No. 629,793. Patented Aug. 1, 1899.

O. KLOTZ.
HANDLE FOR COVERS FOR VESSELS.
(Application filed Dec. 7, 1898.)

(No Model.)

Witness,
D. C. Sumner.
Jay W. Kunkle.

Inventor,
Otto Klotz,
By George P. Barton,
Attorneys.

THE NORRIS PETERS CO., PHOTO-LITHO., WASHINGTON, D. C.

UNITED STATES PATENT OFFICE.

OTTO KLOTZ, OF CHICAGO, ILLINOIS.

HANDLE FOR COVERS FOR VESSELS.

SPECIFICATION forming part of Letters Patent No. 629,793, dated August 1, 1899.

Application filed December 7, 1898. Serial No. 698,589. (No model.)

*To all whom it may concern:*

Be it known that I, OTTO KLOTZ, a citizen of the United States, residing at Chicago, in the county of Cook and State of Illinois, have invented a new and useful Cover for Culinary Utensils, of which the following is a specification.

My invention relates to a cover for culinary utensils, such as saucepans and the like; and its object is to provide a cover controllable at the extreme end of the handle of the saucepan, whereby the cover may be held in place while manipulating the saucepan—as, for instance, in pouring off the liquor from solids which have been cooking, leaving the solids undisturbed—and whereby the cover may be readily removed when desired, all without the necessity of touching the cover directly.

Generally speaking, my invention comprises a cover or lid adapted to fit the top of the saucepan, said cover having a handle extending substantially radially therefrom and having at its outer end a narrow tongue adapted to be run through and engage with a hole provided in the end of the handle to the saucepan. The tongue above referred to is preferably bent or buckled to engage the saucepan-handle more closely and to permit the two handles to lie closely together, one resting along the top of the other. The end of the tongue is preferably extended some little distance beyond the end of the saucepan-handle, so that the cover may be easily manipulated by grasping the projecting extreme end of said tongue in an obvious manner.

My invention will be more particularly described by reference to the accompanying drawings, wherein—

Figure 1:
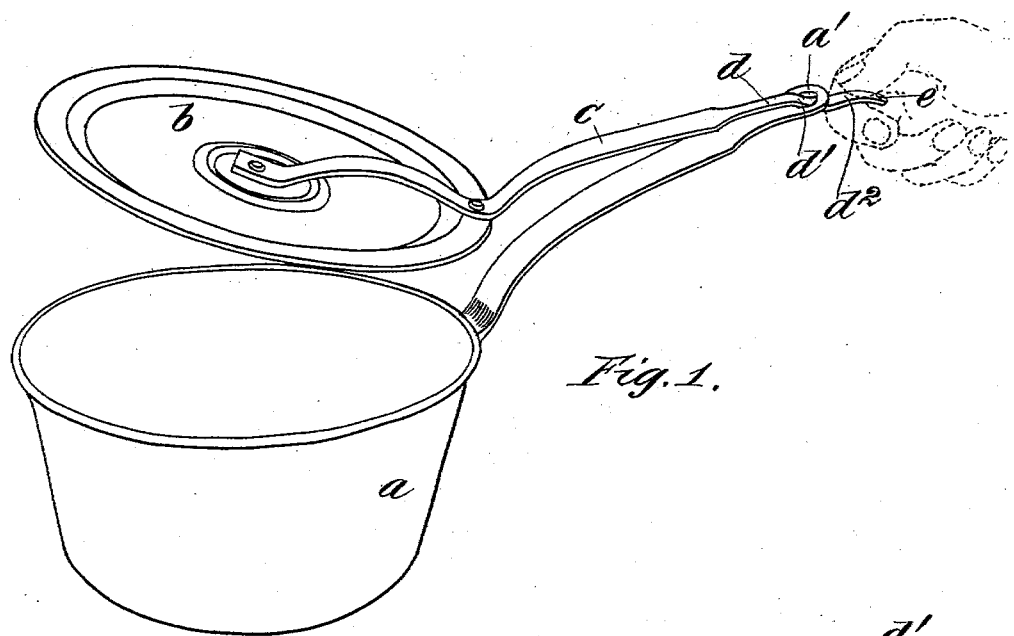
Figure 2:
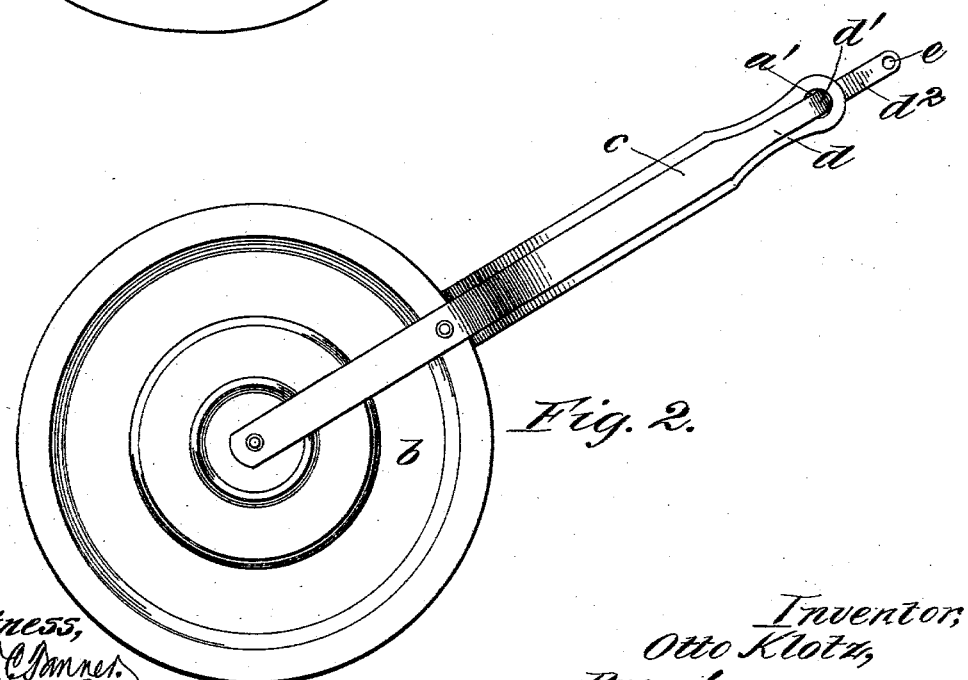

Figure 1 is a perspective view showing the cover of my invention applied to a saucepan and illustrating the manner in which it may be manipulated from the end of the handle of the latter. Fig. 2 is a plan view showing the cover in place.

Similar letters of reference are used to designate the same parts in both figures.

An ordinary saucepan $a$ is illustrated, having, as is usual, a hole $a'$ in the end of the handle thereof. Heretofore the handles of saucepans have been provided with such holes merely for convenience in hanging the saucepans upon a nail or hook, and it is an especial advantage of the cover of my invention that it may be applied to ordinary saucepans without modification of the latter in any way. A handle $c$ is attached to the lid $b$ and extends substantially radially therefrom, being preferably shaped, as illustrated, to lie along the top of the saucepan-handle.

The end of the cover-handle is cut away to form a narrow tongue $d$, which may be readily passed through the hole in the handle to the saucepan, and this tongue is bent or buckled at $d'$ to engage the latter more closely and to permit the two handles to lie snugly together, so that both may easily be grasped at the same time when it is desired to manipulate the saucepan and at the same time to maintain the cover in place. The extreme end $d^2$ of the tongue $d$, which projects beyond the end of the saucepan-handle, may be grasped by the fingers of the user in an obvious manner to remove or manipulate the cover, the tongue and handle thus serving as a lever fulcrumed at the bent or buckled portion $d'$, which engages the hole in the saucepan-handle. For convenience a hole $e$ may be provided in the extreme end of the tongue, whereby the pan and cover may be hung up together.

It will be appreciated that the above construction permits the saucepan and cover to be manipulated together with ease in almost any desired manner without the necessity of touching the cover directly, thus obviating the danger of burning or soiling the hands of the user, and the cover may as easily be instantly detached from the vessel.

Having thus described my invention, what I claim as new, and desire to secure by Letters Patent, is—

1. The combination with a vessel provided with a handle having a hole at the end thereof, of a cover for said vessel having a handle extending outwardly therefrom along the top of the vessel-handle, the outer end of said cover-handle being formed into a narrow tongue adapted to pass through the said hole, said tongue being bent or buckled where it normally passes through the hole, whereby the cover and vessel are detachably held together, substantially as described.

2. The combination with a vessel provided with a handle having a hole at the end thereof, of a cover for said vessel having a handle extending outwardly therefrom along the top of the vessel-handle, the outer end of said cover-handle being formed into a narrow tongue adapted to pass through the said hole, said tongue being bent or buckled where it passes through the hole and extending outwardly beyond the end of the vessel-handle, whereby the cover may be adjusted relatively to the vessel by grasping and manipulating the projecting end of said tongue, substantially as set forth.

3. The combination with a vessel provided with a handle having a hole in the outer end thereof, of a cover having a handle extending outwardly therefrom along the top of the vessel-handle and having its outer end shaped to form a narrow tongue adapted to pass through, and engage with, the hole in the vessel-handle, whereby the vessel and cover are detachably held together and may be manipulated as a single piece substantially as set forth.

4. As a new article of manufacture, a cover for vessels having a handle extending outwardly therefrom, the extremity of said handle being shaped to form a narrow tongue $d$, said tongue being bent or buckled at $d'$, substantially as and for the purposes set forth.

OTTO KLOTZ.

Witnesses:
SOPHIA GREENE,
GUSTAV H. KLOTZ.